United States Patent
Hirai et al.

[11] Patent Number: 5,408,491
[45] Date of Patent: Apr. 18, 1995

[54] OPTICAL ISOLATOR

[75] Inventors: Shigeru Hirai; Shigeru Semura; Dai Yui, all of Kanagawa, Japan

[73] Assignee: Sumitomo Electric Industries, Ltd., Osaka, Japan

[21] Appl. No.: 197,835

[22] Filed: Feb. 17, 1994

[30] Foreign Application Priority Data

Feb. 17, 1993 [JP] Japan ................... 5-027944

[51] Int. Cl.$^6$ .................... H01S 3/00; G02B 27/28
[52] U.S. Cl. ..................... 372/92; 372/703; 359/484
[58] Field of Search ............... 372/92, 703; 359/281, 359/484

[56] References Cited

U.S. PATENT DOCUMENTS 5,096,763  3/1992  Ogata et al. ............... 335/303
5,278,853  1/1994  Shirai et al. .............. 372/703

FOREIGN PATENT DOCUMENTS

0252509   1/1988  European Pat. Off. .
0489315   6/1992  European Pat. Off. .
60-49297 11/1985  Japan .
0049728   3/1988  Japan ................... 359/484
0044310   2/1990  Japan ................... 359/484
246419    2/1990  Japan .
268515    3/1990  Japan .
0178611   7/1990  Japan ................... 359/484
5157993   6/1993  Japan ................... 372/703

Primary Examiner—Rodney B. Bovernick
Assistant Examiner—Robert McNutt
Attorney, Agent, or Firm—Cushman, Darby & Cushman

[57] ABSTRACT

An optical isolator comprising first through fourth plate-like birefringent substances. Each plate-like birefringent substance receives and transmits incident light, and has a corresponding optical axis which is inclined with respect to a direction of the incident light. The optical isolator also has first and second magneto-optical materials, each for rotating a plane of polarization of the incident light. The optical axis of the second plate-like birefringent substance is rotated by one of $-45°$ and $135°$ about a first axis which is perpendicular to a surface of the first plate-like birefringent substance. The optical axis of the third plate-like birefringent substance is rotated by one of $45°$ and $225°$ about a second axis which is perpendicular to the surface of the first plate-like birefringent substance. The optical axis of the fourth plate-like birefringent substance is rotated by one of $-90°$ and $90°$ about a third axis which is perpendicular to the surface of the first plate-like birefringent substance. The first and third plate-like birefringent substance have equal thicknesses. The second and fourth plate-like birefringent substances are $(1+\sqrt{2})$ times as thick as the first plate-like birefringent substance. The first and second magneto-optical materials rotate the plane of polarization in opposite directions. Finally, the optical isolator has an element for magnetizing the first and second magneto-optical materials.

8 Claims, 13 Drawing Sheets

OPTICAL ISOLATOR

BACKGROUND OF THE INVENTION

1. Field of the Invention

The present invention relates to polarization independent optical isolators for shielding return beams which are reflected by optical systems (i.e. optical fiber communication systems utilizing semiconductor lasers or optical fiber amplifiers).

2. Description of the Related Art

Semiconductor lasers, which are used as light sources for performing input and output operations in optical fiber communication systems and optical disks, suffer from unstable oscillations when return beams are reflected by the optical system. These return beams are caused by factors such as an end surface of an optical fiber, connecting points between optical fibers, coupling lenses, and optical connectors. The unstable oscillation caused by return beams leads to significant impairment of performance such as an increase in noise and fluctuations in the output.

Optical isolators of various types have been developed so as to remove such instability in the operation of the semiconductor lasers. One such type of optical isolator is the polarization independent optical isolator. The polarization independent optical isolator may utilize the separation/synthesis of the ordinary ray (hereinafter "O ray") and the extraordinary ray (hereinafter "E ray") through the use of plate-like birefringent crystals such as rutiles and calcites. An advantage of the use of this type of polarization independent optical isolator is that it exhibits isolation effects upon all planes of polarization without being dependent on the direction of polarization.

For example, Examined Japanese Patent Publication No. Sho. 60-49297 discloses an optical isolator in which a first plate-like birefringent crystal, a magneto-optical material (i.e. Faraday rotator), an optically active crystal, and a second plate-like birefringent crystal are arranged in order from an incident end. That optical isolator has a permanent magnet for magnetizing the magneto-optical material. Unexamined Japanese Patent Publication No. 2-46419 and Unexamined Japanese Patent Publication No. 2-68515 each disclose an optical isolator in which not only two or more magneto-optical materials and three or more plate-like birefringent crystals are arranged, but also a permanent magnet for magnetizing the magneto-optical materials is provided.

In such conventional optical isolators, the direction and angle of rotation of a plane of polarization by the magneto-optical material as well as the direction and amount of displacement of polarization by the plate-like birefringent crystal have not been adequately studied. Accordingly, it has been found that the plane of polarization of an incident light beam can change as it passes through an optical isolator. It has also been found that differences in the path length (i.e. dispersion of a polarized wave) can also be caused by passing through an optical isolator. The particular effects on the beam depend on the polarization of the incident light beam. The result of the change in the polarization and the dispersion of the polarized wave is that the signal beam can become disturbed.

Moreover, conventional optical isolators fail to take into consideration methods of obviating the fluctuations in performance with respect to different operating temperatures and changes in the wavelength of the incident light beam. Therefore, there are no prior art optical isolators which are highly reliable and that can be used satisfactorily in many applications.

SUMMARY OF THE INVENTION

An object of the present invention is to provide an optical isolator in which a plane of polarization of an incident light beam does not change after being passed through the optical isolator. The signal beam should not be disturbed by dispersion of a polarized wave. Furthermore, fluctuations in the physical properties of the optical isolator should be affected only moderately by changes in the operating temperature or changes in the wavelength of the incident light beam.

The optical isolator according to the present invention comprises first through fourth plate-like birefringent substances, each for receiving and transmitting an incident beam of light. Each plate-like birefringent substance has a corresponding optical axis which is inclined with respect to a direction of the incident beam of light. The optical isolator also includes first and second magneto-optical materials, each for rotating a plane of polarization of the incident beam of light. The optical axis of the second plate-like birefringent substance is rotated by one of −45° and 135° about a first axis which is perpendicular to a surface of the first plate-like birefringent substance. The optical axis of the third plate-like birefringent substance is rotated by one of 45° and 225° about a second axis which is perpendicular to the surface of the first plate-like birefringent substance. The optical axis of the fourth plate-like birefringent substance is rotated by one of −90° and 90° about a third axis which is perpendicular to the surface of the first plate-like birefringent substance. The first and third plate-like birefringent substance having thicknesses which are equal. The second and fourth plate-like birefringent substances each have a thickness which is $(1+\sqrt{2})$ times as thick as the first plate-like birefringent substance. The second magneto-optical material rotates the plane of polarization in a direction which is opposite to the direction of rotation of the first magneto-optical material. Finally, the optical isolator includes a magnetized element for magnetizing the first and second magneto-optical materials.

DETAILED DESCRIPTION OF THE INVENTION

The detailed description of the present invention will now be described with respect to the accompanying drawings.

Figure 1A:
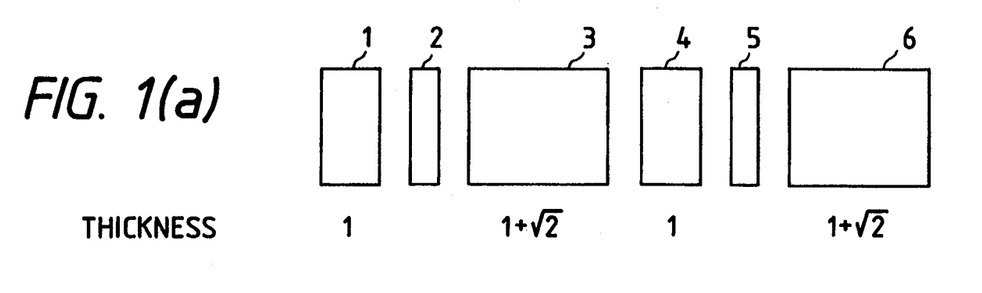
FIG. 1(a) is a schematic side view showing an arrangement of an optical isolator according to the present invention.
Figure 1B:
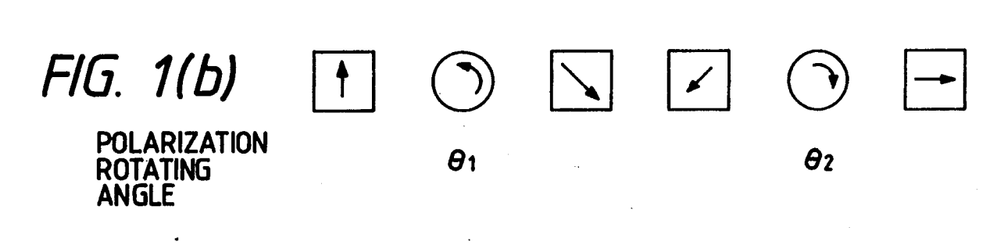
FIG. 1(b) is a schematic front view showing an arrangement of the optical isolator according to the embodiment of the present invention as shown in FIG. 1(a)

FIGS. 1(a) and 1(b) are schematic views showing arrangements of an optical isolator according to the present invention. As shown in FIG. 1(a), the optical isolator includes: a first plate-like birefringent crystal 1; a first magneto-optical material 2; a second plate-like birefringent crystal 3; a third plate-like birefringent crystal 4; a second magneto-optical material 5; and a fourth plate-like birefringent crystal 6. Light enters first plate-like birefringent crystal 1 and eventually exits from fourth plate-like birefringent crystal 6 (i.e. the forward direction). The optical isolator also has a permanent magnet (not shown) for magnetizing the first and second magneto-optical materials 2 and 5, respectively.

The direction of the optic axes corresponding to each plate-like birefringent crystal have to be inclined with respect to a direction of the incident light. For example, in the case of a rutile crystal, the direction has to be inclined by 47° to 48°. The optic axes of the first and fourth plate-like birefringent crystals, 1 and 6 respectively, are arranged so as to rotate about an axis, which is perpendicular to their surface, so as to be 90° from each other. The ratio of the thickness of first plate-like birefringent crystal 1 to that of fourth plate-like birefringent crystal 6 is $1:(1+\sqrt{2})$. The second and third plate-like birefringent crystals, 3 and 4 respectively, are arranged so as to be rotated exactly by 45° about an axis which is perpendicular to their surface with respect to the directions of the optic axes of the first and fourth plate-like birefringent crystals, 1 and 6 respectively. The ratio of the thickness of second plate-like birefringent crystal 3 to that of third plate-like birefringent crystal 4 is $(1+\sqrt{2}):1$.

The first and second magneto-optical materials, 2 and 5 respectively, are magnetized by the permanent magnet (not shown) so as to rotate their corresponding planes of polarization by +45° and −45°, respectively. Hereinafter, such angles are referred to as "polarization rotating angles". This is shown in FIG. 1(b) by the use of $\theta_1$ and $\theta_2$ for the rotating angles of the first and second magneto-optical materials 2 and 5, respectively.

If the polarization rotating angles of the first and second magneto-optical materials, 2 and 5 respectively, are shifted slightly from the aforementioned angles of +45° and −45°, the optical isolator exhibits a decrease in the amount of fluctuations caused by changes in the operating temperature and changes in the wavelength of the incident light beam.

FIGS. 2(a), 2(b), 2(c), 3(a) and 3(b) are diagrams showing light beam displacements for explaining the operation of an optical isolator having the arrangement depicted in FIG. 1(a).

First, an optical isolator will be described in which polarization rotating angles $\theta_1$ and $\theta_2$ of magneto-optical materials 2 and 5, are defined as being $+45°$ and $-45°$, respectively.

In the drawings, each arrow indicates the direction in which the light beam propagates. The symbols A to D designate the directions (or conditions) of polarization. The subscripts o and e designate the O ray and the E ray, respectively. Reference characters $L_1$ to $L_3$ designate unpolarized light beams. The positions of the light beams are viewed from the incident end in the forward direction. Further, ⊖, ⓪, ⓪ and ⊘ indicate the condition of the polarizations.

Figure 2A:
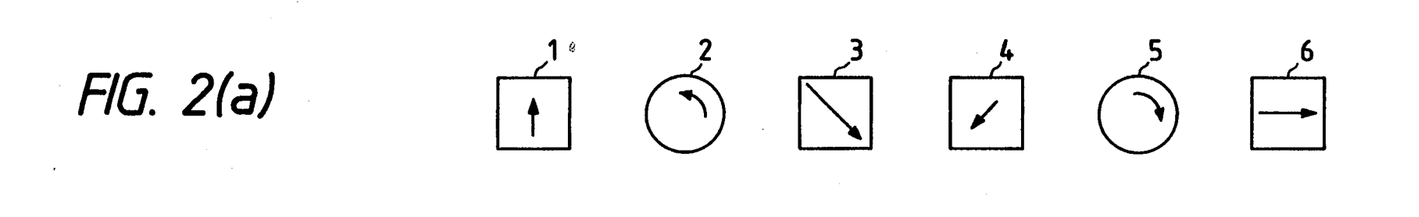
FIG. 2(a) is a schematic front view showing an arrangement of the optical isolator according to the embodiment of the present invention as shown in FIG. 1(a)
Figure 2B:
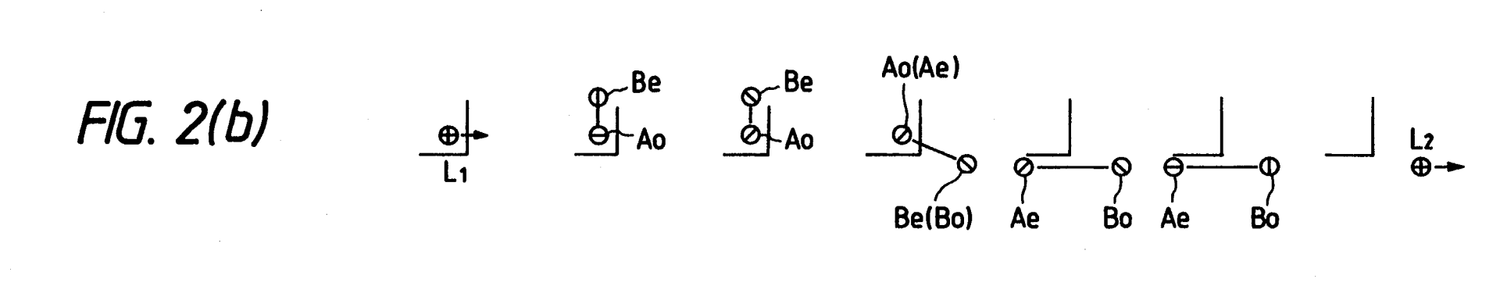
FIG. 2(b) is a schematic front view showing how the displacement of a light beam in a forward direction in the optical isolator according to the present invention operates.

With reference to FIG. 2(b), the displacement of a light beam in the forward direction will now be described. A light beam $L_1$ injected into first plate-like birefringent crystal 1 is separated into its components $A_o$ and $B_e$, with only component $B_e$ being displaced. The amount of displacement at this time is determined by the birefringence of first plate-like birefringent crystal 1 and the thickness thereof. Components $A_o$ and $B_e$ are rotated by 45° through the use of first magneto-optical material 2. The rotated components then propagate into second plate-like birefringent crystal 3 as components $A_o$ and $B_e$, with only component $B_e$ being displaced. Components $A_o$ and $B_e$ at this time are transformed into components $A_e$ and $B_o$ within third plate-like birefringent crystal 4, with only component $A_e$ being displaced. Components $A_e$ and $B_o$ exit from third plate-like birefringent crystal 4 and enter fourth plate-like birefringent crystal 6 while being rotated by $-45°$ through the use of second magneto-optical material 5. At this point, only component $A_e$ is displaced. Accordingly, components $A_e$ and $B_o$ are superimposed upon one another so as to exit as a single light beam $L_2$.

Figure 3A:
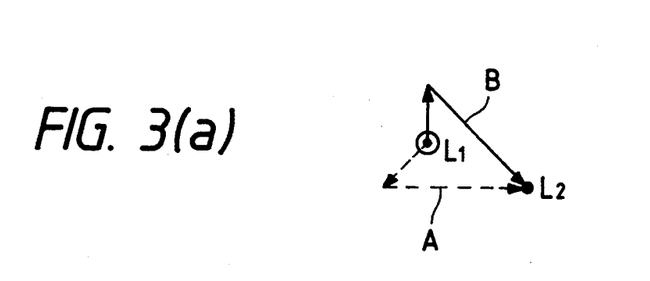
FIG. 3(a) is a front view showing the displacement of a light beam in the forward direction in the optical isolator according to the present invention.

FIG. 3(a) shows the displacements of component A and B as they pass through each of the plate-like birefringence crystals as described above.

Figure 2C:
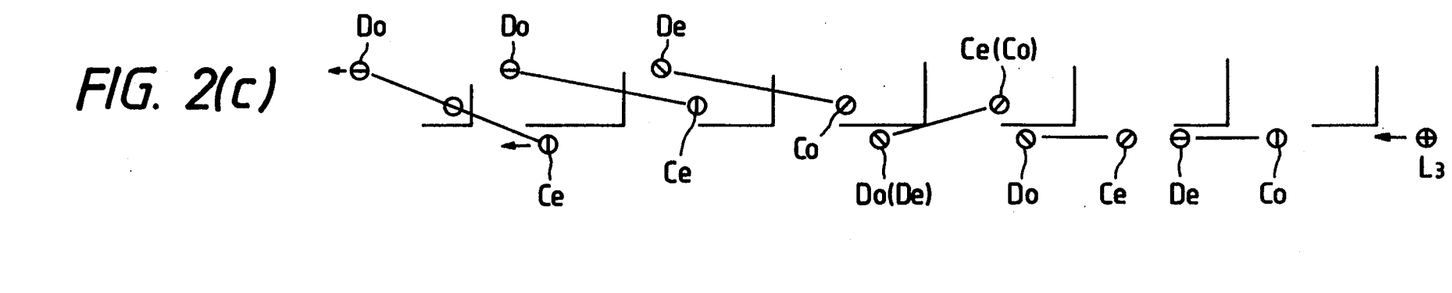
FIG. 2(c) is a schematic front view showing how the displacement of a light beam in a backward direction in the optical isolator according to the present invention operates.

With reference to FIG. 2(c), the displacement of a light beam in the backward direction will now be described. A light beam $L_3$ propagates into fourth plate-like birefringent crystal 6 and is thereby separated into components $C_o$ and $D_e$, with only component $D_e$ being displaced. Components $C_o$ and $D_e$ are rotated by $-45°$ through the use of second magneto-optical material 5. The rotated components then propagate into third plate-like birefringent crystal 4 as components $C_e$ and $D_o$, with only component $C_e$ being displaced. At this point, components $C_e$ and $D_o$ are transformed into components $C_o$ and $D_e$ within second plate-like birefringent crystal 3, with only component $D_e$ being displaced. Components $C_o$ and $D_e$ then exit from second plate-like birefringent crystal 3 are rotated by $+45°$ through the use of first magneto-optical material 2. The rotated components then enter first plate-like birefringent crystal 1 as components $C_e$ and $D_o$, with only component $C_e$ being displaced. The components $C_e$ and $D_o$ are then passed through first plate-like birefringent crystal 1 but remain separated. Thus, a single light beam is not synthesized. In other words, neither of the components exit from first plate-like birefringent crystal 1 at the exit position.

Figure 3B:
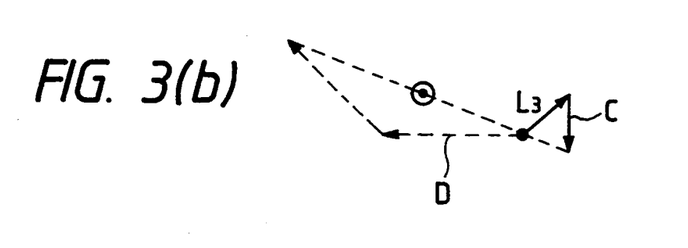
FIG. 3(b) is a front view showing the displacement of a light beam in the backward direction in the optical isolator according to the present invention.
Figure 4A:
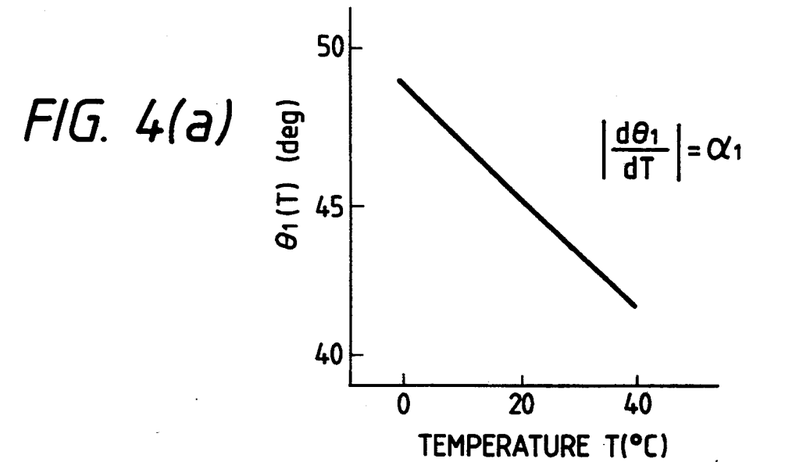
FIG. 4(a) is a graph showing the changes in the polarization rotating angle of a magneto-optical material with respect to the operating temperature.
Figure 4B:
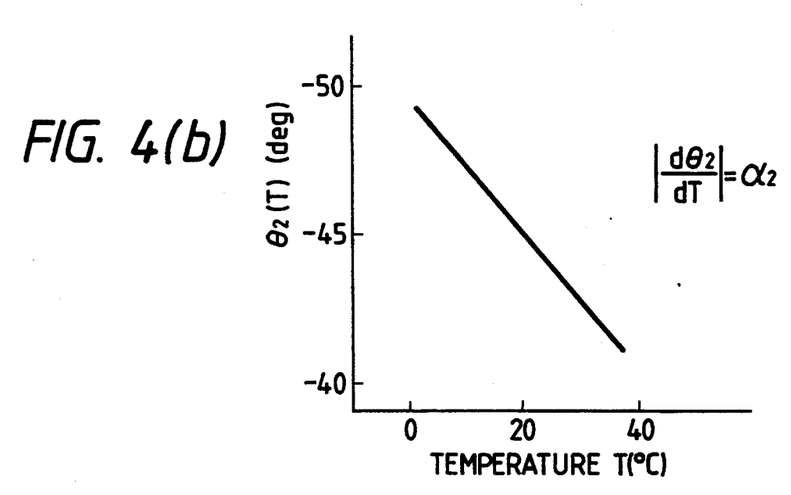
FIG. 4(b) is a graph showing the changes in the polarization rotating angle of a magneto-optical material with respect to the operating temperature.
Figure 5A:
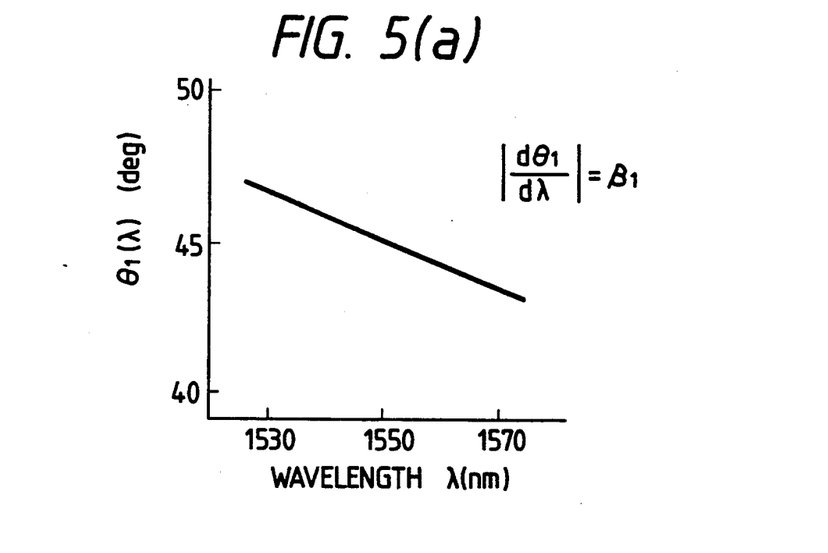
FIG. 5(a) is a graph showing changes in the polarization rotating angles of the magneto-optical material with respect to the wavelength of an incident light beam.
Figure 5B:
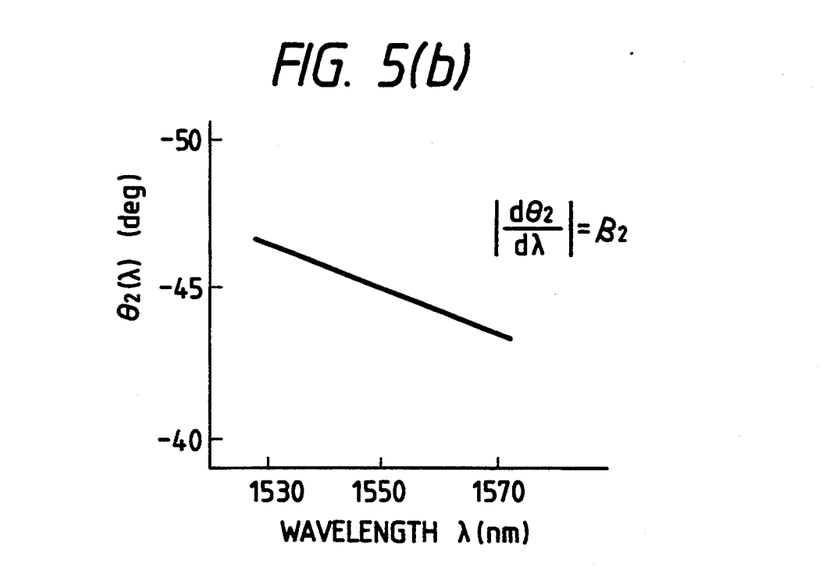
FIG. 5(b) is a graph showing changes in the polarization rotating angles of the magneto-optical material with respect to the wavelength of an incident light beam.

FIG. 3(b) shows the displacements of component C and D as they pass through each of the plate-like birefringence crystals as described above.

From the results shown in FIGS. 2(b), 2(c), 3(a) and 3(b), the light beams A and B as well as the light beams C and D have path lengths that are substantially equal to one another. Since the path lengths are substantially equal, dispersion of a polarized wave would be satisfactory if this optical isolator was used.

An isolation characteristic can be obtained through the use of the aforementioned operation when the polarization rotating angles $\theta_1$ and $\theta_2$ of the magneto-optical materials 2 and 5 are shifted from $+45°$ and $-45°$, respectively. The characteristics of this type of embodiment will now be described.

The polarization rotating angles of the magneto-optical materials 2 and 5 are generally changed depending on the operating temperature and the wavelength of an incident light beam as shown in FIGS. 4(a), 4(b), 5(a) and 5(b). Under such conditions, changes in polarization rotating angle $\theta_1$ and $\theta_2$ are given by the following equations.

$$\theta_1(T,\lambda) = 45° - \Delta\theta_1(T,\lambda)$$

$$\theta_2(T,\lambda) = -\{45° + \Delta\theta_2(T,\lambda)\}$$

Figure 6A:
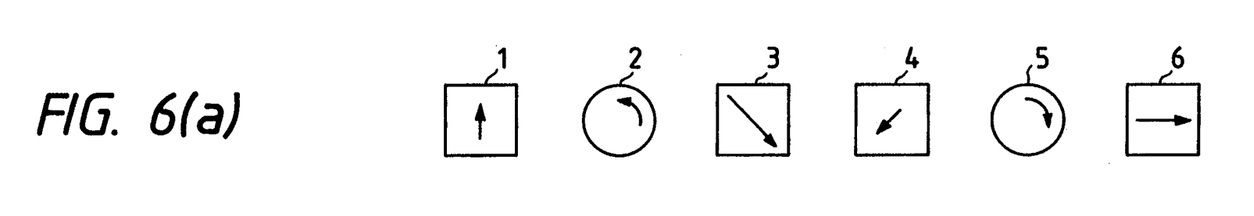
FIG. 6(a) is a schematic front view showing an arrangement of the optical isolator when the polarization rotating angles of the magneto-optical materials are shifted from 45°.
Figure 6B:
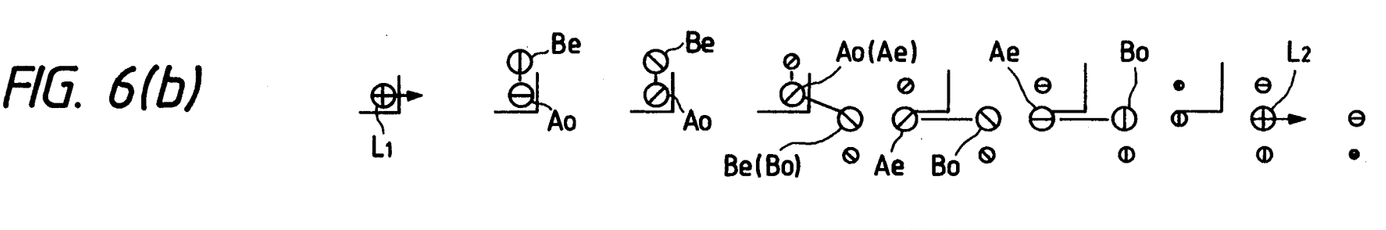
FIG. 6(b) is a schematic front view showing how the displacement of a light beam in a forward direction in the optical isolator according to the present invention operates when the polarization rotating angles of the magneto-optical materials are shifted from 45°.
Figure 6C:
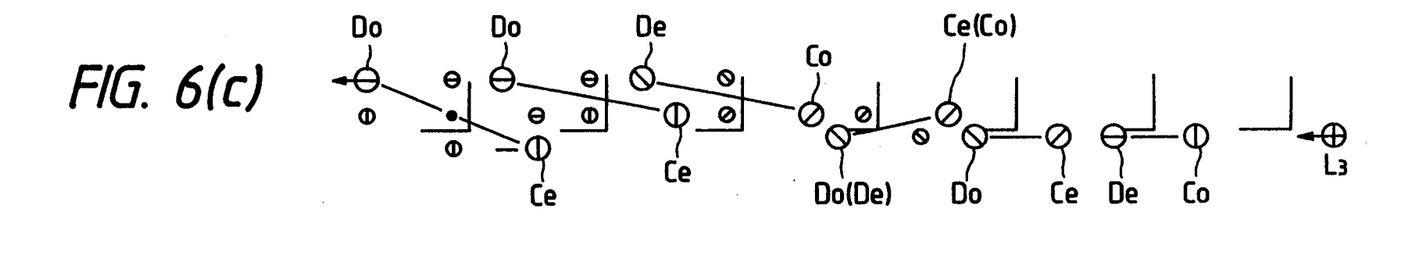
FIG. 6(c) is a schematic front view showing how the displacement of a light beam in a backward direction in the optical isolator according to the present invention operates when the polarization rotating angles of the magneto-optical materials are shifted from 45°.

FIGS. 6(a), 6(b) and 6(c) show the operation of the optical isolator according to this embodiment. In the drawings, ⊖, ⓪, ⓪ and ⊘ indicate the condition of the polarizations. The size of the circle indicate the intensity of the light.

As shown in FIG. 6(a), light is being propagated in the forward direction and the polarization rotating angles $\theta_1$ and $\theta_2$ are shifted from $+45°$ and $-45°$, respectively, so that the principal light beam is separated into a multiple number of light beams. As a result, after the light beams pass through fourth plate-like birefringent crystal 6, six light beams of relatively small intensity appear in addition to the principal light beam. This same description holds true when light is propagated in the backward direction. Thus, in addition to the two principal light beams $C_e$ and $D_o$, three other light beams having a relatively small light intensity appear. Under these conditions, a loss increment ($\Delta\alpha_f$) in the forward direction and an isolation (I) are expressed by the following equations.

$$\Delta\alpha_f = -10 \log_{10} \{\cos^2(\Delta\theta_1) \cos^2(\Delta\theta_2)\}$$

$$I = -10 \log_{10}\{\sin^2(\Delta\theta_1) \sin^2(\Delta\theta_2)\}$$

For example, if the polarization rotating angles $\theta_1$ and $\theta_2$ are set exactly to $+45°$ and $-45°$ at an operating temperature of 20° C. and at a center wavelength of an incident beam of light is 1550 nm, then $\Delta\theta_1$ and $\Delta\theta_2$ can be expressed by the following equations.

$$\Delta\theta_1 = \alpha_1(20-T) + \beta_1(1550-\lambda)$$

$$\Delta\theta_2 = -\{\alpha_2(20-T) + \beta_2(1550-\lambda)\}$$

Figure 7A:
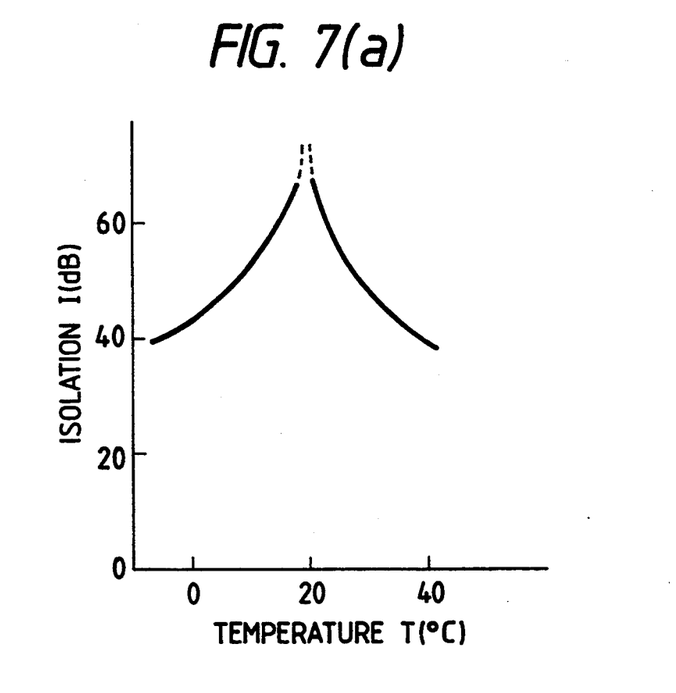
FIG. 7(a) is a graph showing the dependency of temperature on the optical isolator shown in FIG. 1 when the polarization rotating angles of the magneto-optical materials are set to 45°.
Figure 7B:
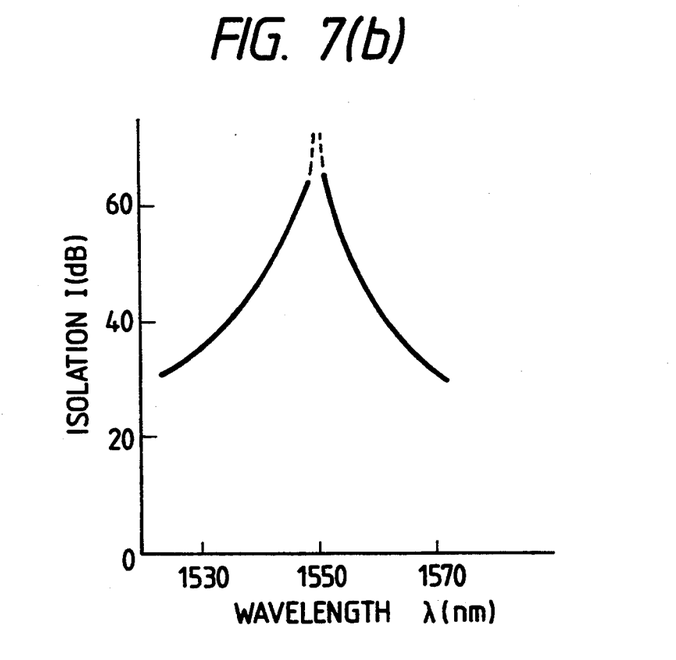
FIG. 7(b) is a graph showing the dependency of wavelength on the optical isolator shown in FIG. 1 when the polarization rotating angles of the magneto-optical materials are set to 45°.

Thus, this type of optical isolator is dependent upon the temperature and the wavelength of the incident light as shown in FIGS. 7(a) and 7(b) when graphed against the isolation (I). In other words, a maximum isolation can be obtained at a temperature of 20° C. and when the wavelength of an incident beam of light is 1550 nm. When the temperature and the wavelength shift from those values, the isolation becomes impaired.

On the other hand, if the polarization rotating angles of the first and second magneto-optical materials 2 and 5 are set to $+45°$ and $-45°$, respectively, and the temperature is shifted from 20° C. and the wavelength is shifted from the center wavelength of 1550 nm, the angles $\theta_1$ and $\theta_2$ can then be expressed by the following equations.

$$\theta_1 = 45 + \alpha_1\{(20-\Delta T) - T\} + \beta_1\{(1550-\Delta\lambda) - \lambda\}$$

$$\theta_2 = -\{45 + (\alpha_2\{(20-\Delta T) - T\} + \beta_1\{(1550+\Delta\lambda) - \lambda\})\}$$

Figure 8A:
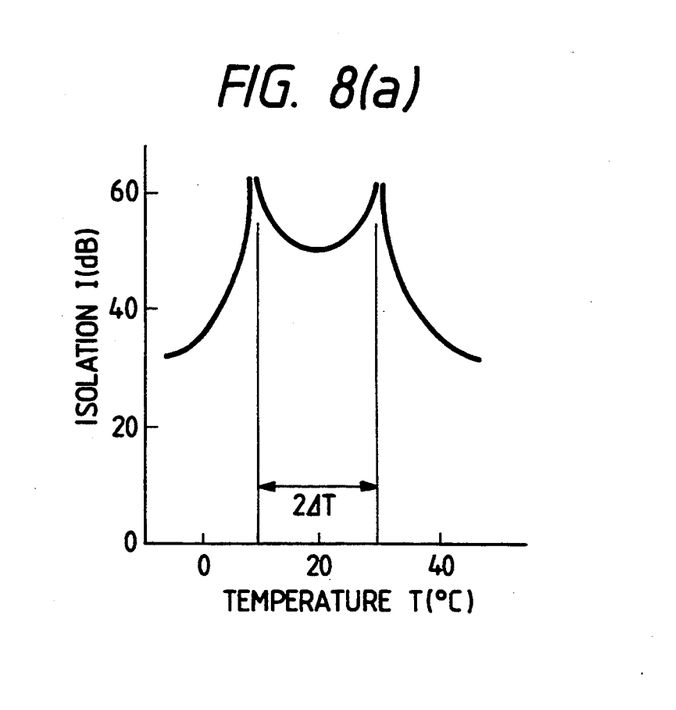
FIG. 8(a) is a graph showing the dependency of temperature on the optical isolator shown in FIG. 1 when the polarization rotating angles of the magneto-optical materials are shifted from 45°.
Figure 8B:
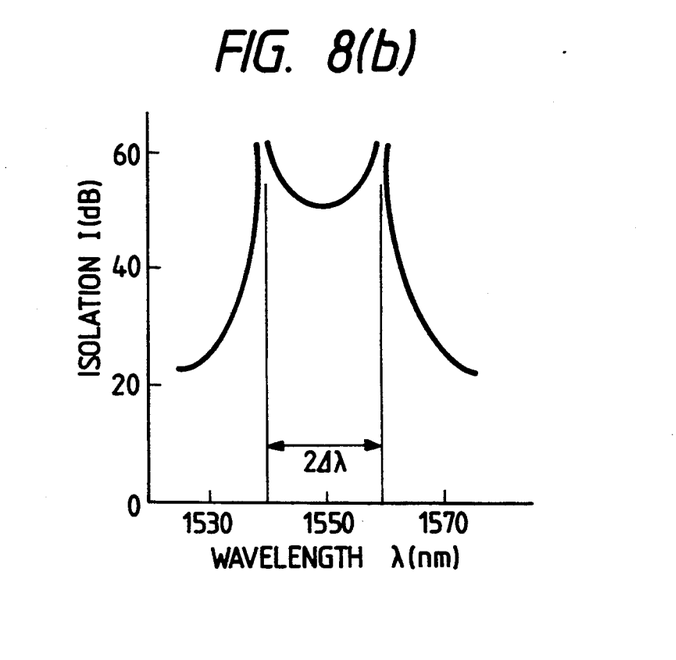
FIG. 8(b) is a graph showing the dependency of wavelength on the optical isolator shown in FIG. 1 when the polarization rotating angles of the magneto-optical materials are shifted from 45°.

Thus, this type of optical isolator is dependent upon the temperature and the wavelength of the incident light as shown in FIGS. 8(a) and 8(b) when graphed against the isolation I. While the maximum isolation under these conditions is smaller than the previously described conditions (i.e. as seen in FIGS. 7(a) and 7(b)), the superposition of the isolation peaks provides a high isolation at relatively wider ranges of temperature (i.e. 2ΔT) and wavelength (i.e. 2Δλ). This can be seen in FIGS. 9(a) and 9(b).

Figure 9A:
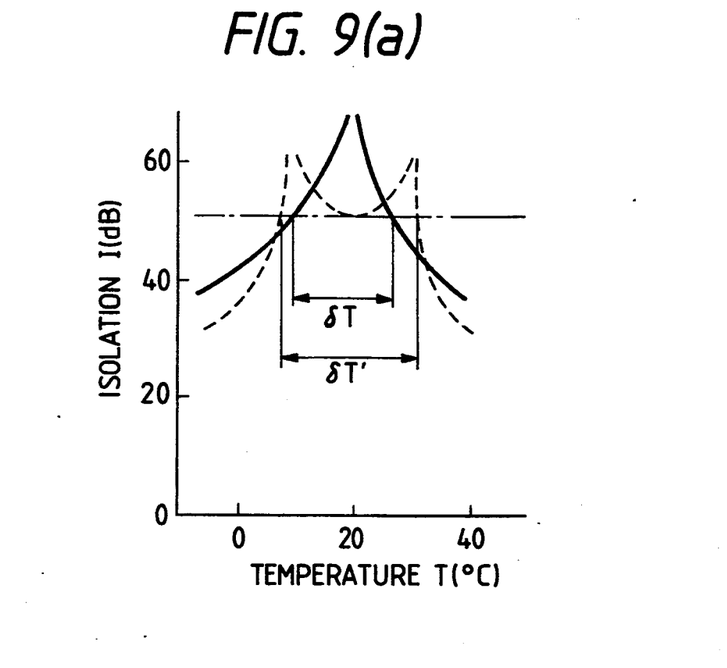
FIG. 9(a) is a graph showing a comparison between the graphs of FIGS. 7(a) and 8(a)
Figure 9B:
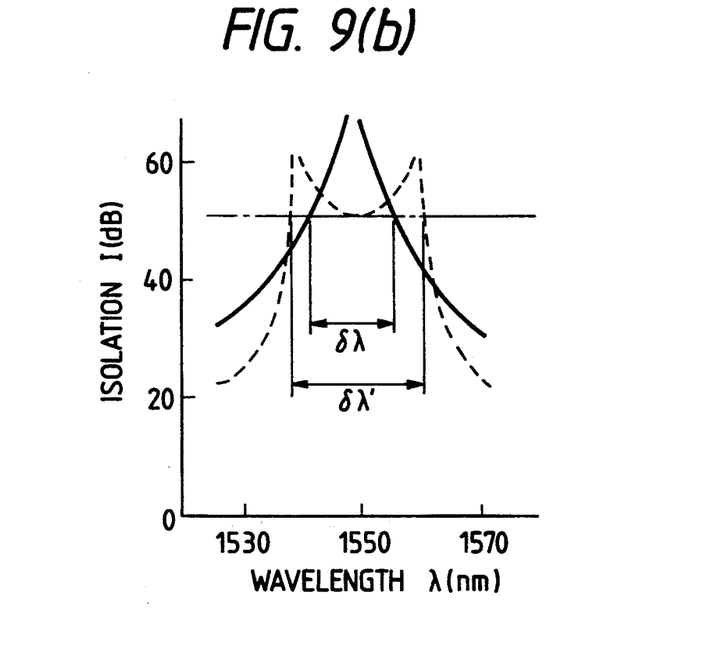
FIG. 9(b) is a graph showing a comparison between the graphs of FIGS. 7(b) and 8(b)

In FIGS. 9(a) and 9(b), the solid lines indicates the conditions where the polarization rotating angles of the first and the second magneto-optical materials 2 and 5 are set to +45° and -45°, respectively, the operating temperature is set to 20° C. and the center wavelength of an incident beam of light is set to 1550 nm. The dotted lines indicate the conditions where the polarization rotating angles of the first and the second magneto-optical materials 2 and 5 are set so as to be shifted from +45° and -45°, respectively, the operating temperature is set to 20° C. and the center wavelength of an incident beam of light is set to 1550 nm. As seen by the dotted line, an isolation of about 50 dB or more can be obtained over a wide ranges of temperatures and wavelengths. This type of characteristic is required by ordinary optical fiber amplifiers.

Under the conditions indicated by the dotted lines, the polarization rotating angles $\theta_1$ and $\theta_2$ of the magneto-optical materials, 2 and 5 respectively, can be represented by the following equation when the operating temperature is 20° C. and the center wavelength of an incident beam of light is 1550 nm.

$$\theta_1 = 45 - (\alpha_1 \Delta T + \beta_1 \Delta\lambda)$$

$$\theta_2 = -\{45 + (\alpha_2 \Delta T + \beta_2 \Delta\lambda)\}$$

First magneto-optical material 2, is preferably $(TbBi)_3Fe_5O_{12}$, $(HoTbBi)_3Fe_5O_{12}$, or $(YbTbBi)_3Fe_5O_{12}$. Second magneto-optical material 5 is preferably, $(GdBi)_3(FeAlGa)_5O_{12}$, $(TbBi)_3(AlFe)_5O_{12}$, or YIG. However, if YIG is used miniaturization of the optical isolator becomes difficult since YIG is a thick material.

Representative values for $\alpha_1$, $\beta_1$, $\alpha_2$, and $\beta_2$ in the respective materials are shown in the table below.

|  | α (deg/°C.) | β (deg/nm) |
|---|---|---|
| First magneto-optical material 2 | | |
| $(TbBi)_3Fe_5O_{12}$ | 0.04 | 0.09 |
| $(HoTbBi)_3Fe_5O_{12}$ | 0.06 | 0.09 |
| $(YbTbBi)_3Fe_5O_{12}$ | 0.06 | 0.09 |
| Second magneto-optical material 5 | | |
| $(GdBi)_3(FeAlGa)_5O_{12}$ | 0.08 | 0.09 |
| $(TbBi)_3(AlFe)_5O_{12}$ | 0.05 | 0.09 |
| YIG | 0.03 | 0.04 |

The typical range of operating temperatures for an optical isolator when used within an optical fiber amplifier is 20°±40° C. (i.e. -20° C. to 60° C.). Similarly, the range of wavelengths of an incident beam of light is 1550±20 nm (i.e. 1530 nm to 1570 nm). Therefore, it is preferable for $\theta_1$ and $\theta_2$ to be set so that they are within the ranges represented by the following equations.

$$(45 - 40\alpha_1 - 20\beta_1)° \leq \theta_1 < 45°$$

$$45° < -\theta_2 \leq (45 + 40\alpha_2 + 20\beta_2)°$$

However, if first magneto-optical material 2 is $(TbBi)_3Fe_5O_{12}$, $(HoTbBi)_3Fe_5O_{12}$, or $(YbTbBi)_3Fe_5O_{12}$, and second magneto-optical 5 material is $(GdBi)_3(FeAlGa)_5O_{12}$ or $(TbBi)_3(AlFe)_5O_{12}$, it is appropriate to set $\theta_1$ and $\theta_2$ within the ranges given by the following equations.

$$40° \leq \theta_1 \leq 42°$$

$$48° \leq -\theta_2 \leq 50°$$

Figure 10:
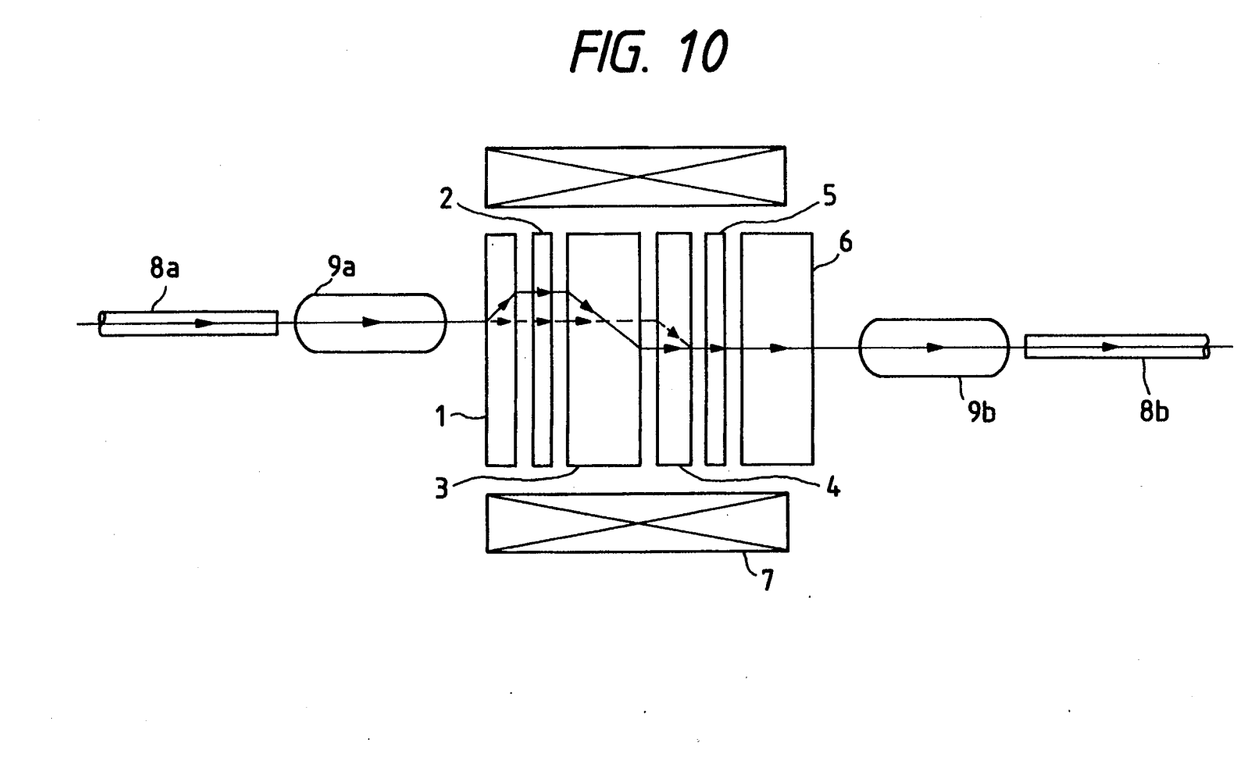
FIG. 10 is a schematic view showing an arrangement of an optical isolator according to an embodiment of the present invention.

FIG. 10 is a schematic view showing an arrangement of an optical isolator according to an embodiment of the present invention. The same parts and components used in the optical isolator shown in FIG. 1(a) are designated by the same reference characters. A duplicate descriptions of these parts are omitted.

Each birefringent crystals 1, 3, 4, and 6 are comprised of rutile crystals. Birefringent crystals 1, 3, 4, and 6 were set to thicknesses of 0.5 mm, 1.21 mm, 0.5 mm, and 1.21 mm, respectively. Faraday rotators were used for the first and second magneto-optical materials 2 and 5, respectively. The Faraday rotators were selected so that the planes of polarization were rotated in directions which were opposite to each other by the first and second magneto-optical materials 2 and 5, respectively. Furthermore, in this embodiment, $(HoTbBi)_3Fe_5O_{12}$ was used as first magneto-optical material 2; and $(GdBi)_3(FeAlGa)_5O_{12}$ was used as second magneto-optical material 5. A permanent magnet 7 was arranged so as to magnetize the first and second magneto-optical materials 2 and 5, respectively.

In FIG. 10, reference characters 8a and 8b designate optical fibers on the entrance side and the exiting side of the optical isolator body. Reference characters 9a and 9b designates lenses for optically coupling the optical fibers 8a and 8b to the entrance side and the exiting side of the optical isolator body. An optical beam from optical fiber 8a is propagated into the optical isolator and diverged by lens 9a. The optical beam exits from the optical isolator body and is propagated into optical fiber 8b while being converged by lens 9b.

Figure 11A:
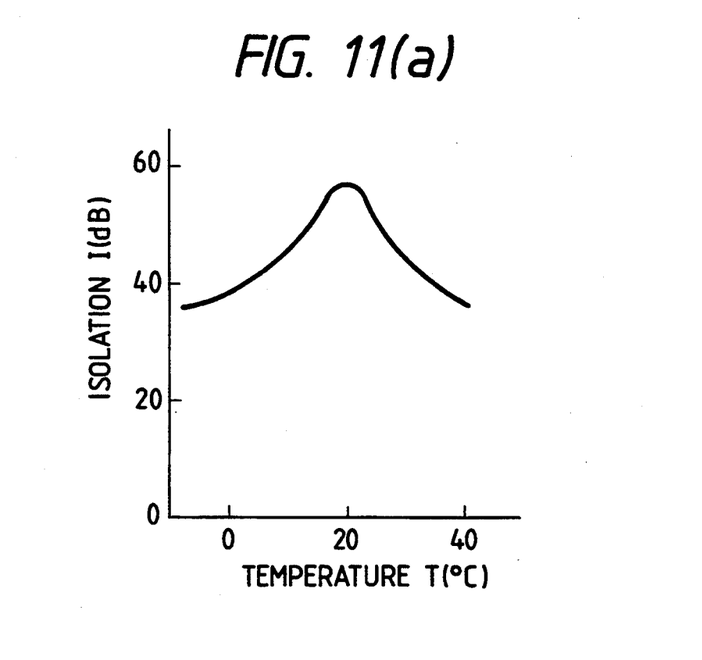
FIG. 11(a) is a graph showing the dependency of temperature on the optical isolator according to a first embodiment of the present invention.
Figure 11B:
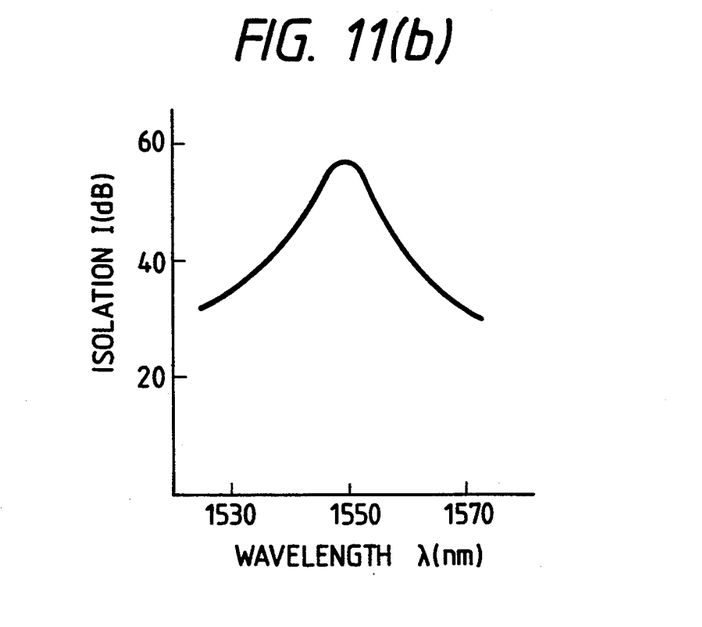
FIG. 11(b) is a graph showing the dependency of wavelength on the optical isolator according to a first embodiment of the present invention.

The performance of the foregoing arrangement has been evaluated. Accordingly, a forward direction insertion loss of 0.8 dB and a backward direction insertion loss (i.e. isolation) of 56 dB were obtained. A difference in the path lengths between the two polarized components within the optical isolator body was determined to be less than 3 μm. It was also determined that the plane of polarization of the incident beam of light did not change after passing through the optical isolator. This optical isolators dependency on temperature and wavelength is shown in FIGS. 11(a) and 11(b), respectively.

In another embodiment according to the present invention, an optical isolator was arranged is the same fashion as the optical isolator shown in FIG. 10. However, in this embodiment, $(YbTbBi)_3Fe_5O_{12}$ was used as first magneto-optical material 2 and $(GdBi)_3(FeAlGa)_5O_{12}$ was used as second magneto-optical material 5.

The respective polarization rotating angles of the first and second magneto-optical material 2 and 5 were set to +41° and −49°, respectively, at a temperature of 20° C. and the wavelength of the incident beam of light was 1550 nm.

In addition, the other embodiment of the optical isolator of the present invention will be described as follows.

Figure 12A:
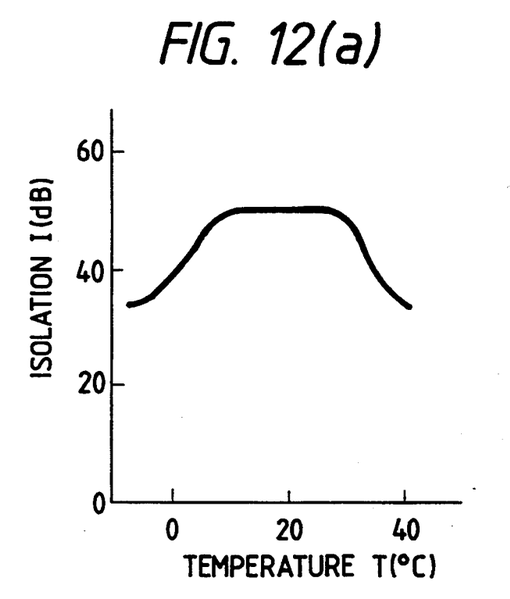
FIG. 12(a) is a graph showing the dependency of temperature on the optical isolator according to a second embodiment of the present invention.
Figure 12B:
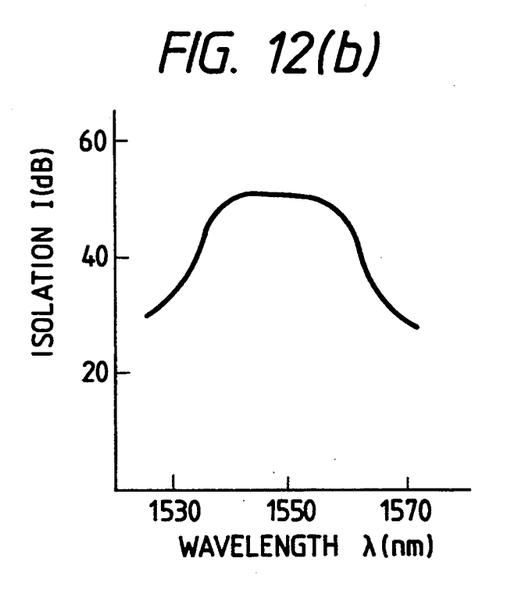
FIG. 12(b) is a graph showing the dependency of wavelength on the optical isolator according to a second embodiment of the present invention.
Figure 13:
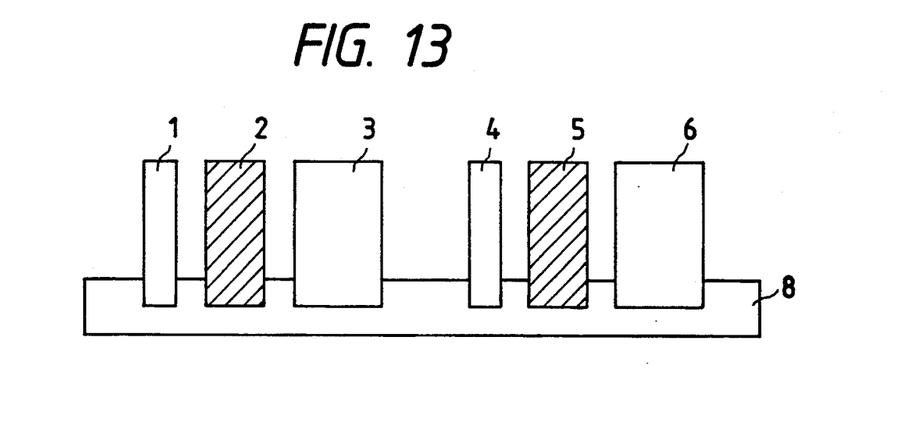
FIG. 13 is a schematic view showing an arrangement of an optical isolator according to an embodiment of the present invention.

As shown in FIG. 13, each birefringent crystals 1, 3, 4, and 6 are comprised of rutile crystals. Birefringent crystals 1, 3, 4, and 6 were set to thicknesses of 0.5 mm, 1.21 mm, 0.5 mm, and 1.21 mm, respectively. Faraday rotators were used for the first and second magneto-optical materials 2 and 5, respectively, which are comprised of $(GdBi)_3(FeAlGa)_5O_{12}$. The reason why using $(GdBi)_3(FeAlGa)_5O_{12}$ as a faraday rotator, its saturation magnetic density is smaller than the other material so that the magnetism of a magnet for giving an applying magnet field does not have to be large. As shown in FIG. 12, a part of each of the six piece of materials 1 to 6 is inserted into grooves of a silicon substitute 8 respectively, so that the materials are adhered and fixed thereon.

Figure 14:
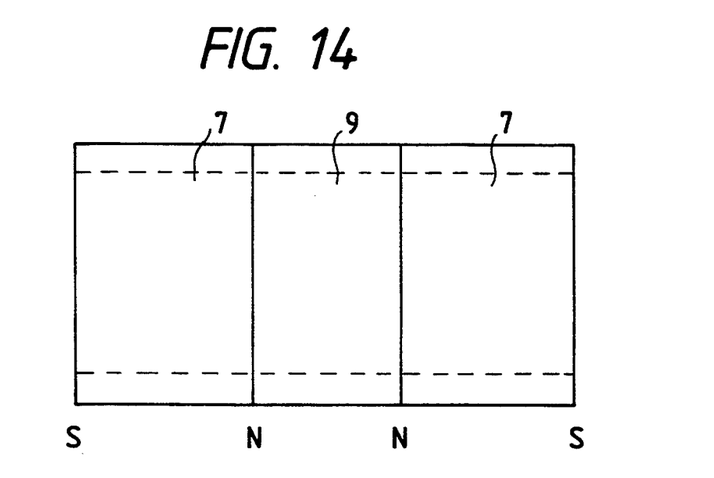
FIG. 14 is a schematic view showing an arrangement of a magnetic portion of an optical isolator according to an embodiment of the present invention.

As shown in FIG. 14, two magnets 7,7 are fixed through a spacer 9 each other. The spacer 9 contributes to reduce a repulsion force between the magnets 7,7 having opposite magnetic field respectively. For example, if ferrite magnet having a magnetic field density of about 300 Oe is used, the spacer having a length of 2 mm is enough to reduce the repulsion force. Furthermore, if ferromagnetic such as iron, soft iron or the like is used as the spacer, the repulsion force is eliminated and a little attractive force is generated, thereby improving a workability for fixing.

The elements as shown in FIG. 13 is inserted and fixed into the magnet portion as shown in FIG. 14 so as to obtain the optical isolator.

The performance of the foregoing arrangement was evaluated. Accordingly, a forward direction insertion loss of 0.9 dB and a backward direction insertion loss (i.e. isolation) of 50 dB were obtained. The dependency of this optical isolator on temperature and wavelength is shown in FIGS. 12(a) and 12(b), respectively. It has been determined that this optical isolator can achieve an isolation of 50 dB or more in a wider range of temperature and wavelength than the previously described optical isolator.

In sum, according to the present invention, an optical isolator which exhibits excellent characteristics of dispersion of a polarized wave and which retains a plane of polarization can be obtained. Therefore, the optical isolator can be used effectively as an optical fiber amplifier whose noise characteristics is extremely good. Moreover, according to the present invention, high isolation can be obtained in wide ranges of operating temperature and wavelength. As a result, a highly reliable optical isolator can be provided.

What is claimed:

1. An optical isolator comprising:
   a first plate-like birefringent substance for receiving an incident beam of light and for transmitting the incident beam of light, the first plate-like birefringent substance having a first optical axis which is inclined with respect to a direction of the incident beam of light;
   a first magneto-optical material for rotating a plane of polarization of the incident beam of light which is transmitted by the first plate-like birefringent substance;
   a second plate-like birefringent substance for receiving the incident beam of light from the first magneto-optical material and transmitting the incident beam of light, the second plate-like birefringent substance having a second optical axis, the second optical axis being inclined with respect to the direction of the incident beam of light, the second optical axis being rotated by one of −45° and 135°, with respect to the first optical axis of the first plate-like birefringent substance, about a first axis which is perpendicular to a surface of the first plate-like birefringent substance, the second plate-like birefringent substance having a thickness which is $(1+\sqrt{2})$ times as thick as the first plate-like birefringent substance;
   a third plate-like birefringent substance for receiving the incident beam of light from the second plate-like birefringent substance and for transmitting the incident beam of light, the third plate-like birefringent substance having a third optical axis, the third optical axis being inclined with respect to the direction of the incident beam of light, the third optical axis being rotated by one of 45° and 225°, with respect to the first optical axis of the first plate-like birefringent substance, about a second axis which is perpendicular to the surface of the first plate-like birefringent substance, the third plate-like birefringent substance having a thickness equal to the thickness of the first plate-like birefringent substance;
   a second magneto-optical material for rotating the plane of polarization of the incident beam of light, which is transmitted by third plate-like birefringent substance, in a direction which is opposite to the direction of rotation of the first magneto-optical material;
   a fourth plate-like birefringent substance for receiving the incident beam of light from the second magneto-optical material and for transmitting the incident beam of light, the fourth plate-like birefringent substance having a fourth optical axis, the fourth optical axis being inclined with respect to the direction of the incident beam of light, the fourth optical axis being rotated by one of −90° and 90°, with respect to the first optical axis of the first plate-like birefringent substance, about a third axis which is perpendicular to the surface of the first plate-like birefringent substance, the fourth plate-like birefringent substance having a thickness which is $(1+\sqrt{2})$ times as thick as the first plate-like birefringent substance; and
   magnetizing means for magnetizing the first magneto-optical material and the second magneto-optical material.

2. An optical isolator according to claim 1, wherein a first angle of rotation of the plane of polarization of the incident beam of light by the first magneto-optical material is shifted slightly from 45° in one of the direction of rotation and in a direction which is opposite to the direction of rotation, and wherein a second angle of rotation of the plane of polarization of the incident beam of light by the second magneto-optical material is shifted slightly from −45° in a direction which is opposite to the direction of the shifting of the first magneto-optical material.

3. An optical isolator according to claim 2, wherein:

the first magneto-optical material is comprised of one of (TbBi)₃Fe₅O₁₂, (HoTbBi)₃Fe₅O₁₂, and (YbTbBi)₃Fe₅O₁₂;

the second magneto-optical material is comprised of one of (GdBi)₃(FeAlGa)₅O₁₂ and (TbBi)₃(AlFe)₅O₁₂;

the first angle of rotation of the plane of polarization of the incident beam of light by the first magneto-optical material is between 40° and 42°, inclusive; and the second angle of rotation of the plane of polarization of the incident beam of light by the second magneto-optical material is between 48° and 50°, inclusive.

4. An optical isolator according to claim 1, wherein the first and second magneto-optical material are comprised of (GdBi)₃(FeAlGa)₅O₁₂.

5. An optical isolator according to claim 4, wherein the magnetizing means is two magnets which are supported through a spacer.

6. An optical isolator according to claim 5, wherein the spacer comprises ferromagnetic material.

7. An optical isolator comprising:

a first plate-like birefringent substance for receiving an incident beam of light and for transmitting the incident beam of light, the first plate-like birefringent substance having a first optical axis which is inclined with respect to a direction of the incident beam of light;

a first magneto-optical material for rotating a plane of polarization of the incident beam of light which is transmitted by first plate-like birefringent substance;

a second plate-like birefringent substance for receiving the incident beam of light from the first magneto-optical material and transmitting the incident beam of light, the second plate-like birefringent substance having a second optical axis, the second optical axis being inclined with respect to the direction of the incident beam of light, the second optical axis being rotated by one of −45° and 135°, with respect to the first optical axis of the first plate-like birefringent substance, about a first axis which is perpendicular to a surface of the first plate-like birefringent substance, the second plate-like birefringent substance having a thickness which is $(1+\sqrt{2})$ times as thick as the first plate-like birefringent substance;

a third plate-like birefringent substance for receiving the incident beam of light from the second plate-like birefringent substance and for transmitting the incident beam of light, the third plate-like birefringent substance having a third optical axis, the third optical axis being inclined with respect to the direction of the incident beam of light, the third optical axis being rotated by one of 45° and 225°, with respect to the first optical axis of the first plate-like birefringent substance, about a second axis which is perpendicular to the surface of the first plate-like birefringent substance, the third plate-like birefringent substance having a thickness equal to the thickness of the first plate-like birefringent substance;

a second magneto-optical material for rotating the plane of polarization of the incident beam of light, which is transmitted by third plate-like birefringent substance, in a direction which is opposite to the direction of rotation of the first magneto-optical material;

a fourth plate-like birefringent substance for receiving the incident beam of light from the second magneto-optical material and for transmitting the incident beam of light, the fourth plate-like birefringent substance having a fourth optical axis, the fourth optical axis being inclined with respect to the direction of the incident beam of light, the fourth optical axis being rotated by one of −90° and 90°, with respect to the first optical axis of the first plate-like birefringent substance, about a third axis which is perpendicular to the surface of the first plate-like birefringent substance, the fourth plate-like birefringent substance having a thickness which is $(1+\sqrt{2})$ times as thick as the first plate-like birefringent substance; and magnetizing means for magnetizing the first magneto-optical material and the second magneto-optical material; and wherein a first angle of rotation of the plane of polarization of the incident beam of light by the first magneto-optical material is set so as to satisfy the equation:

$$(45-40\alpha_1-20\beta_1) \leq \theta_1 < 45;$$

and a second angle of rotation of the plane of polarization of the incident beam of light by the second magneto-optical material is set so as to satisfy the equation:

$$45 < -\theta_2 \leq (45+40\alpha_2-20\beta_2);$$

wherein:

$$\alpha_1 = \left|\frac{d\theta_1}{dT}\right|; \alpha_2 = \left|\frac{d\theta_2}{dT}\right|;$$

$$\beta_1 = \left|\frac{d\theta_1}{d\lambda}\right|; \beta_2 = \left|\frac{d\theta_2}{d\lambda}\right|;$$

$\theta_1$ represents the first angle of rotation of the plane of polarization of the incident beam of light by the first magneto-optical material;

$\theta_2$ represents the second angle of rotation of the plane of polarization of the incident beam of light by the second magneto-optical material;

T represents an operating temperature; and $\lambda$ represents a wavelength of the incident beam of light.

8. An optical isolator according to claim 7, wherein:

the first magneto-optical material is comprised of one of (TbBi)₃Fe₅O₁₂, (HoTbBi)₃Fe₅O₁₂, and (YbTbBi)₃Fe₅O₁₂;

the second magneto-optical material is comprised of one of (GdBi)₃(FeAlGa)₅O₁₂ and (TbBi)₃(AlFe)₅O₁₂;

the first angle of rotation of the plane of polarization of the incident beam of light by the first magneto-optical material is between 40° and 42°, inclusive; and the second angle of rotation of the plane of polarization of the incident beam of light by the second magneto-optical material is between 48° and 50°, inclusive.

* * * * *